(12) United States Patent
Lauffenberger et al.

(10) Patent No.: US 6,849,845 B2
(45) Date of Patent: Feb. 1, 2005

(54) LOW POWER INTEGRATING CIRCUIT FOR USE WITH A PHOTODETECTOR AND OPTICAL SENSOR INCLUDING SUCH AN INTEGRATING CIRCUIT

(75) Inventors: James Harold Lauffenberger, Colorado Springs, CO (US); Kevin Scott Buescher, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 429 days.

(21) Appl. No.: 10/073,368

(22) Filed: Feb. 13, 2002

(65) Prior Publication Data
US 2003/0150979 A1 Aug. 14, 2003

(51) Int. Cl.[7] .............................................. H01J 40/14
(52) U.S. Cl. ........................ 250/214 SW; 250/214 A; 250/214 R; 330/308; 327/77; 327/514
(58) Field of Search ...................... 250/214 A, 214 SW, 250/214 R; 327/77, 514; 330/308

(56) References Cited

U.S. PATENT DOCUMENTS

| 5,602,511 A | * | 2/1997 | Woolaway | 330/282 |
|---|---|---|---|---|
| 6,031,217 A | * | 2/2000 | Aswell et al. | 250/208.1 |
| 6,128,039 A | * | 10/2000 | Chen et al. | 348/294 |
| 6,150,649 A | * | 11/2000 | Wake et al. | 250/208.1 |
| 6,201,248 B1 | * | 3/2001 | Marion et al. | 250/370.08 |
| 6,252,462 B1 | * | 6/2001 | Hoffman | 330/308 |
| 6,384,413 B1 | * | 5/2002 | Pain | 250/330 |
| 6,587,003 B2 | * | 7/2003 | Jordanov | 330/308 |
| 6,633,028 B2 | * | 10/2003 | Fowler | 250/208.1 |
| 6,642,501 B2 | * | 11/2003 | Mizuno et al. | 250/214 R |

* cited by examiner

Primary Examiner—David Porta
Assistant Examiner—Davienne Monbleau
(74) Attorney, Agent, or Firm—Sughrue Mion, PLLC

(57) ABSTRACT

There is described an integrating circuit (20) for use with a photodetector (10) and an optical sensor (1) including such an integrating circuit. The integrating circuit comprises an operational amplifier (30) having a non-inverting input (32) connected to a non-zero bias voltage ($V_{PD\text{-}BIAS}$), an inverting input (31) coupled to the photodetector (10), and at least one output (33). This integrating circuit further includes an integrating voltage storage device (25) having a first terminal coupled to the operational amplifier output and a second terminal coupled to the operational amplifier inverting input, and switching circuitry for controlling timing of the integrating circuit and switching the integrating circuit between a reset phase and an integration phase. The switching circuitry includes means (51, 52) for balancing the operational amplifier and developing a voltage across the integrating voltage storage device during the reset phase, which voltage is substantially equal to the bias voltage, the first terminal of the integrating voltage storage device being pulled to a reference potential ($V_{SS}$) during this reset phase.

20 Claims, 3 Drawing Sheets

LOW POWER INTEGRATING CIRCUIT FOR USE WITH A PHOTODETECTOR AND OPTICAL SENSOR INCLUDING SUCH AN INTEGRATING CIRCUIT

FIELD OF THE INVENTION

The present invention generally relates to optical sensors and more particularly to an integrating circuit and method for converting an input photo-generated current into an output voltage signal.

BACKGROUND OF THE INVENTION

Optical sensors are used in a large number of applications such as scanning or digitising systems, optical pointing devices and imaging devices. Optical sensors generally operate by detecting electromagnetic radiation and producing an electrical signal that corresponds to the intensity of the electromagnetic radiation impinging on the optical sensor. Multiple optical sensors are generally used and are often geometrically positioned in arrays with individual optical sensor corresponding to a respective pixel of the array.

Each optical sensor typically comprises a photodetector or photodetecting device, such as a photodiode or phototransistor, for converting electromagnetic radiation into an electrical signal. One specific type of optical sensor further includes an integrating circuit associated with the photodetecting device. In such type of optical sensor, the photodetector generates a photocurrent the value of which is a function of the electromagnetic energy striking the photodetector and this photocurrent is integrated over time, i.e. converted, by the integrating circuit to produce an output voltage.

One already knows optical sensors which include a passive integrating circuit. In such a passive type optical sensor, the photodiode used as photodetector (as well as its associated junction capacitance and attached parasitic capacitance) is initially biased to a high reverse voltage. The photodiode generates a photocurrent which discharges the capacitance, thereby causing the voltage to decrease. The output voltage for this type of optical sensor is generally non-linear with respect to the integrated charge since the diode capacitance is a function of the diode voltage. A further disadvantage of the above passive type optical sensor resides in the fact that the integrating capacitance (defined in this case by the photodiode capacitance and the parasitic capacitance) is determined primarily by the photodiode size. Accordingly, sensitivity cannot be increased by increasing the photodiode size since the capacitance will increase approximately proportionally.

One additionally knows active-type optical sensors comprising a photodetector (typically a photodiode) coupled to an active integrating circuit basically comprising an operational amplifier having a non-inverting input coupled to a reference voltage, an inverting input coupled to the photodiode and an output, an integrating capacitor being connected across the operational amplifier output and inverting input.

An improved optical sensor and integrating circuit are proposed in U.S. Pat. No. 6,031,217. According to this patent, the optical sensor comprises a photodetector (preferably a photodiode) having an output proportional to the intensity of the electromagnetic radiation striking the photodetector and an active integrating circuit coupled with the output of the photodetector for integrating the photodetector output over time to generate an output electrical signal. This integrating circuit basically comprises an operational amplifier having a non-inverting input coupled to a reference voltage, an inverting input and an output, the photodetector being coupled to the amplifier inverting input and to the reference voltage. The integrating circuit further comprises an integrating voltage storage device, i.e. a capacitor, connected across the operational amplifier output and inverting input for storing an accumulated electrical signal from the photodetector. Switching circuitry is further provided for controlling the timing of the active integrating circuit.

According to the above patent, the integrating circuit is operated in such a way as to maintain a photodiode biased at a level close to zero, thereby reducing any associated dark currents. By resetting the output of the integrating circuit to near zero, prior to the start of each integrating cycle, the dark level output of the circuit is sufficiently close to ground that dark level baseline restoration is not normally required. The result is a lower pixel-to-pixel dark level variation and also a reduction in dark current errors at elevated temperatures. In addition, for variable temperature situations, the dark level currents may be reduced and the sensitivity increased as compared to comparable techniques using reversed biased photodiodes.

As mentioned above, the output of the integrating circuit is reset to near zero prior to the start of each integrating cycle. The voltage across the integrating capacitor is therefore null during reset, i.e. below the threshold voltage of a standard MOS transistor. Accordingly, one disadvantage of the solution disclosed in U.S. Pat. No. 6,031,217 resides in the fact that it is not possible to realize the integrating capacitor as a standard MOS transistor, i.e. a MOS transistor having source and drain terminals connected together. Poly or metal layers must therefore be used, which are very area-inefficient.

Maintaining a zero bias voltage across the photodiode indeed has the advantage of reducing any associated dark currents as described in the above patent. However, the photodiode "needs" a large reverse bias across it to be fast and efficient in its collection of photon-generated current. For applications requiring short response time and high collection efficiency, the solution proposed in U.S. Pat. No. 6,031,217 is therefore not adequate.

Another disadvantage of the above solution resides in the fact that the optical sensor requires two separate control lines (designated OSZERO and RUN in U.S. Pat. No. 6,031,217) for zeroing the operational amplifier and for controlling the timing of the integrating circuit. It is generally preferable to keep the number of external lines at a minimum so as to reduce the number of connections to each optical sensor which inevitably necessitate area on the chip.

Accordingly, it is an object of the present invention to provide an optical sensor comprising a photodetector and an integrating circuit which makes it possible to use a standard MOS component as integrating capacitor, thereby avoiding extra process steps, such as the formation of a second poly or metal layer and using die area in a more efficient manner.

A further object of the present invention is to provide a solution that allows to maintain a relatively large reverse bias across a photodiode so as to ensure a fast and efficient collection of photon-generated charges.

Still another object of the present invention is to minimize the number of external connections of the optical sensor in order to avoid wasting area in applications necessitating multiple optical sensors, such as in the case of optical sensing arrays.

Yet another object of the present invention is to provide an optical sensor that may be operated at low voltages and that exhibits low power dissipation.

Another object of the present invention is to provide a solution that meets several other requirements and constraints such as, amongst other things, large output signal swing, high integration gain, high amplifier gain in both modes (integration/run and reset) for accurate reset and integration, amplifier stability, low output impedance to drive the followings signal processing stages, output signal level such that single-pass-transistor switches can be used in following signal blocks, minimal parasitic capacitance at photodiode input, and area efficient layout.

SUMMARY OF THE INVENTION

According to a first aspect of the invention, there is provided an optical sensor for producing an electrical signal in response to electromagnetic radiation, comprising:

a photodetector having an output supplying an electrical signal proportional to the intensity of the electromagnetic radiation striking the photodetector; and an integrating circuit coupled with the output of the photodetector to accumulate the electrical signal from the photodetector, the integrating circuit comprising:

an operational amplifier having a non-inverting input connected to a non-zero bias voltage, an inverting input coupled to the photodetector, and at least one output;

an integrating voltage storage device having a first terminal coupled to the operational amplifier output and a second terminal coupled to the operational amplifier inverting input; and switching circuitry for controlling timing of the integrating circuit and switching the integrating circuit between a reset phase and an integration phase, wherein the switching circuitry includes means for balancing the operational amplifier and developing a voltage across the integrating voltage storage device during the reset phase, which voltage is substantially equal to the bias voltage, the first terminal of the integrating voltage storage device being pulled to a reference potential during the reset phase.

According to a second aspect of the invention, there is provided an integrating circuit for use with a photodetector having an output supplying an electrical signal proportional to the intensity of the electromagnetic radiation striking the photodetector, the integrating circuit comprising:

an operational amplifier having a non-inverting input connected to a non-zero bias voltage, an inverting input capable of being coupled to said photodetector, and at least one output;

an integrating voltage storage device having a first terminal coupled to the operational amplifier output and a second terminal coupled to the operational amplifier inverting input;

an output stage comprising a gate terminal connected to the operational amplifier output and an output terminal connected to the first terminal of the integrating voltage storage device; and switching circuitry for controlling timing of the integrating circuit and switching the integrating circuit between a reset phase and an integration phase, wherein the switching circuitry includes means for balancing the operational amplifier and developing a voltage across the integrating voltage storage device during the reset phase, which voltage is substantially equal to the bias voltage, the first terminal of the integrating voltage storage device being pulled to a reference potential during the reset phase.

According to a particular embodiment of the invention, the integrating circuit includes an output stage comprising a gate terminal connected to the operational amplifier output and an output terminal connected to the first terminal of the integrating voltage storage device, the switching circuitry including:

a first switching device for connecting the output stage gate terminal to the inverting input during the reset phase and for disconnecting the output stage gate terminal from the inverting input during the integration phase; and a second switching device for pulling the output stage output terminal to the reference potential during the reset phase and for releasing the output stage output terminal from the reference potential during the integration phase.

The present invention provides a solution which allows photodetectors having large light capturing capability to be used (despite the consequently large photodiode capacitance). In case the photodetector is a photodiode, the invention further allows a large bias voltage to be applied across the photodiode for it to be fast and efficient in its collection of photon-generated current, without this leading to limitations in the low voltage supply that may be used to power the circuit.

In addition, for the photocurrent-to-voltage output gain to be large, the integrating voltage storage device needs to be small. By putting the integrating voltage storage device around a feedback amplifier, the photocurrent is forced onto the desired integrating voltage storage device (rather than on the large parasitic photodiode capacitor). Indeed, the feedback amplifier forces the input voltage of the amplifier to remain constant, which prevents the photodiode capacitor from accumulating any of the charge and forces the current to flow through the integrating voltage storage device.

Another advantage of the present invention resides in the fact that the circuit allows different voltages to be generated at the input and output during the reset phase, hence allows a voltage to be applied across the integrating voltage storage device (which is substantially equal to the photodetector bias voltage) which is sufficient for allowing the integrating voltage storage device to be formed of a capacitor-connected standard MOS transistor, the voltage being above the threshold voltage of such transistor.

Still another advantage of the invention resides in the fact that the integrating circuit may be operated at a low voltage in an optimal manner. Indeed, since the integrating circuit output is pulled during reset to a reference potential such as ground, while maintaining a sufficient voltage across the integrating voltage storage device, the integrating circuit output will ramp up from ground during integration (in case the photodetector is an n-well photodiode). The maximum circuit output voltage (with reference to ground) is thus defined by the allowable maximum output voltage ramp at the end of the integration. For a low-voltage supply, the maximum circuit output voltage can therefore be maximized resulting in a more optimal design.

In addition, the integrating circuit output typically drives subsequent signal processing blocks, which often consist of multiplexors and other switches. In order to minimize area (signal connections and transistors) in all on-chip circuitry, these switches need to be single transistor switches of small area. In a low supply voltage case, the gate drive of these switches must be able to get substantially above a threshold voltage above both the minimum (in this case ground) and the maximum signal swing (i.e. the maximum output voltage). Since the integrating circuit output ramps up from ground (still in the case of a n-well photodiode), this requirement can more easily be fulfilled with the circuit of the present invention.

Furthermore, it is usually difficult to fit a source-follower output stage into the feedback amplifier in order to lower the output impedance. Doing so generally requires an additional increase in the supply voltage, or a reduction in amplifier gain. If the output impedance is high, then compromises must be made in the following signal processing blocks, requiring additional circuitry, power or performance penalties. The present invention advantageously allows such a source-follower output stage to be used.

Other aspects, features and advantages of the present invention will be apparent upon reading the following detailed description of non-limiting examples and embodiments made with reference to the accompanying drawings.

DETAILED DESCRIPTION OF THE INVENTION

Figure 1:
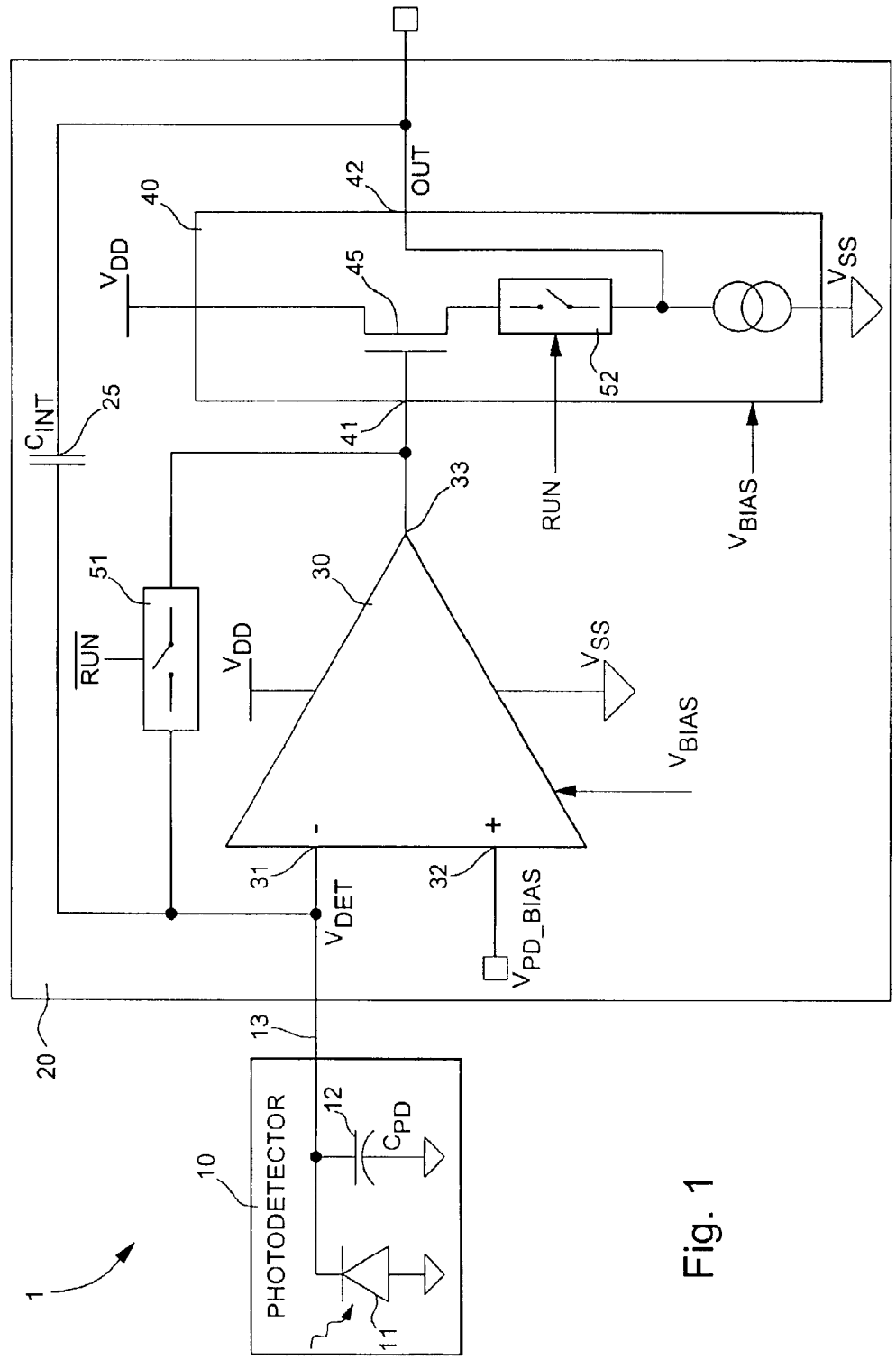
FIG. 1 is a schematic block diagram of an optical sensor comprising a photodetector and an integrating circuit according to one embodiment of the present invention.

FIG. 1 is a generalized schematic bloc diagram of an optical sensor, indicated globally by reference numeral 1, including a photodetector 10 and an integrating circuit 20. The illustrated photodetector 10 here consists of a reverse-biased photodiode 11 (such as an n-well photodiode formed in a p-type semiconductor substrate). For the purposes of this description, the term "photodetector" includes any detector sensitive to radiant energy. Examples include in particular photodiodes, photo-gates and phototransistors. Reference numeral 12 denotes the photodiode capacitance $C_{PD}$. Photodetector 10 has an output 13 which is coupled to integrating circuit 20.

Integrating circuit 20 includes an operational amplifier 30 having an inverting input 31 coupled to photodetector 10, a non-inverting input 32 coupled to a non-zero bias voltage $V_{PD-BIAS}$, which set the desired photodiode reverse bias voltage, and an output 33. By way of non limiting illustration, the photodetector bias voltage is nominally 1.5 Volts.

An integrating voltage storage device 25 (of capacitance value $C_{INT}$) is connected in a negative amplifier feedback loop, i.e. has a first terminal (the integrating circuit output) coupled to the operational amplifier output 33 and a second terminal coupled to the operational amplifier inverting input 31.

Preferably, an output stage 40 is interposed between the operational amplifier output 33 and the first terminal of the integrating voltage storage device 25. According to an embodiment of the invention, this output stage 40 is a source-follower output stage having a gate terminal 41 coupled to the operational amplifier output 33 and an output terminal 42 (source terminal of transistor 45) coupled to integrating voltage storage device 25. As already mentioned hereinabove, this source-follower output stage allows the output impedance to be lowered.

As schematically illustrated in FIG. 1, both the operational amplifier 30 and the output stage 40 are supplied by first and second supply potentials $V_{SS}$ (ground) and $V_{DD}$. Purely for the purpose of illustration, the power supply $V_{DD}$–$V_{SS}$ can be as low as approximately 1.7 Volts, up to approximately 5.5 Volts. An adequate bias voltage $V_{BIAS}$ is also applied to these two blocks.

The integrating circuit 20 further comprises switching circuitry for controlling timing of the integrating circuit 20 and switching the integrating circuit between a reset phase and an integration phase. During the reset phase, the operational amplifier 30 is zeroed and balanced and the integrating voltage storage device 25 is reset (a voltage substantially equal to bias voltage $V_{PD-BIAS}$ being applied across device 25). At the same time, the integrating circuit output OUT is pulled to a reference potential (in this case ground potential $V_{SS}$). During the integration phase, the integrating circuit output OUT (which is a voltage output) ramps up according to the intensity of the electromagnetic radiation striking photodetector 10. According to this embodiment, and by way of illustration only, the integrating circuit output will ramp up from $V_{SS}$ to a maximum voltage approximately equal to 0.6 Volts.

It will be appreciated that the above explanation is based on the fact that an n-well photodiode is used as photodetector 10, the photodetector bias voltage being near the positive supply $V_{DD}$. In case photodetector 10 is a p-well photodiode formed in an n-type semiconductor substrate, the integrating circuit architecture will obviously be inverted and the integrating circuit output will ramp down from the "ground" potential (in such case $V_{DD}$).

According to the embodiment of FIG. 1, the switching circuitry includes a first switching device 51 for connecting the operational amplifier output 33 to its inverting input 31 during the reset phase and for disconnecting the operational amplifier output 33 from its inverting input 31 during the integration phase. The switching circuitry further includes a second switching device 52 for pulling the output stage output terminal 42 to the reference potential during the reset phase and for releasing this output stage output terminal 42 from the reference potential during the integration phase.

As schematically illustrated in the embodiment of FIG. 1, both the first and second switching devices 51 and 52 are controlled by a single control signal RUN. During the reset phase (RUN at low state), switching device 51 is closed thereby connecting the operational amplifier output 33 and inverting input 31, and switching device 52 is open, the integrating circuit output OUT being pulled to the ground potential $V_{SS}$ by means of a current source connected in series with the switching device 52. During integration (RUN at high state), switching device 51 is open and switching device 52 is closed thereby allowing integrating circuit output OUT to ramp up from ground as a function of the photodetector illumination intensity.

It will be appreciated at this stage that the voltage across integrating voltage storage device 25 is always greater that a threshold voltage of a standard CMOS transistor. Accordingly, integrating voltage storage device 25 can advantageously be realized in the form of a MOS transistor operating in accumulation mode, the source and drain terminals (and bulk terminal) being connected together. This is advantageous in the sense that this allows to save substantial area and to manufacture storage device 25 in a standard CMOS process (no additional poly or metal layer required). It will also be appreciated that conventional poly-poly, metal-poly, or metal-metal capacitors may nevertheless be used.

Figure 2:
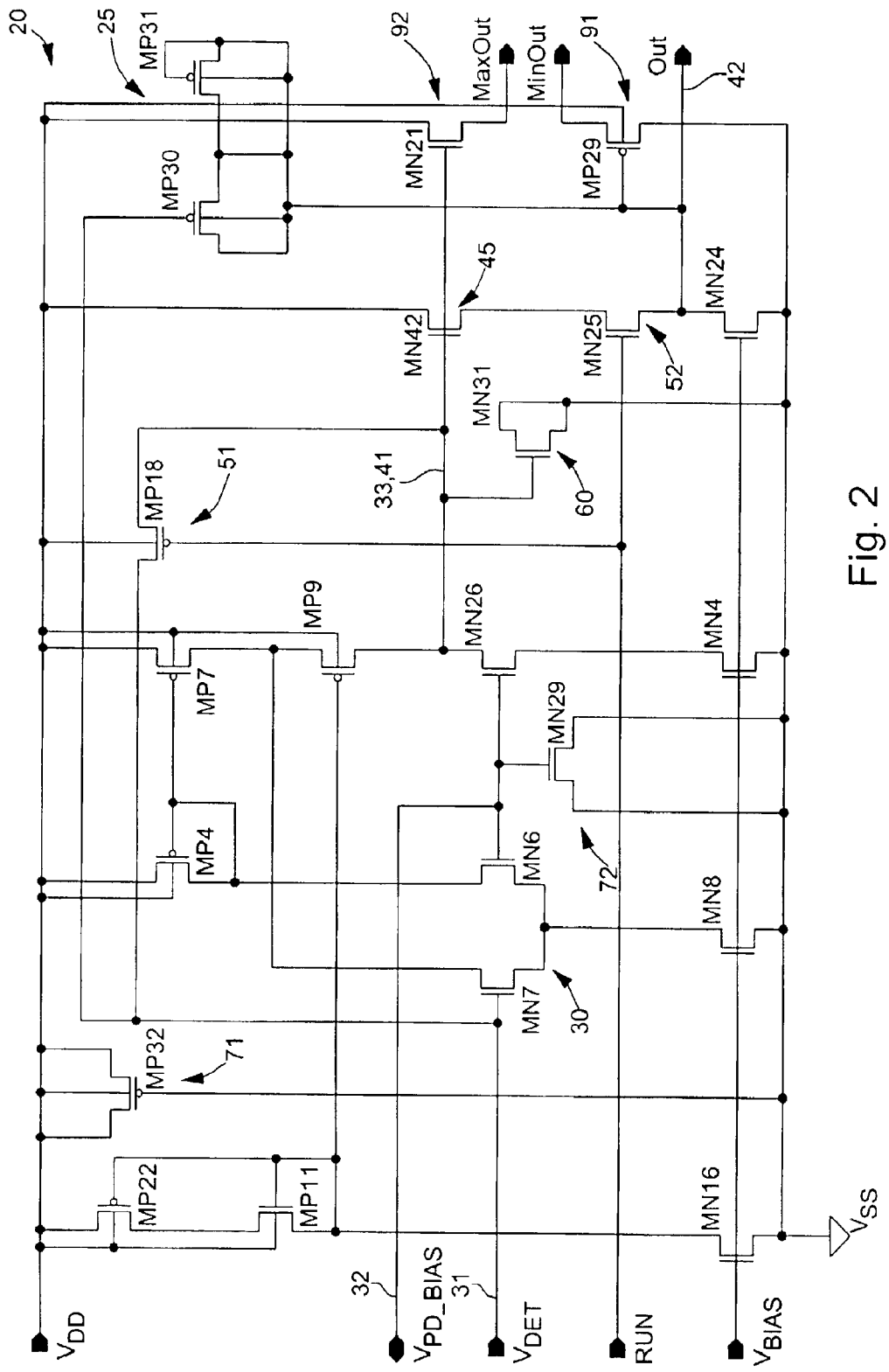
FIG. 2 is a circuit diagram illustrating a first example of an integrating circuit according to the present invention.

Referring now to FIG. 2, one will described in greater detail a possible and advantageous example of the integrating circuit 20 of FIG. 1. In this example, operational amplifier 30 is a differential amplifier comprising a differential pair of transistors MN6 and MN7 and a half-folded cascode stage basically comprising transistors MP4, MP7, MP9 and MN26.

As illustrated in the circuit diagram of FIG. 2, the gate terminals of transistors MN6 and MN7 respectively form the non-inverting input 32 and inverting input 31 of operational amplifier. The source terminals of transistors MN6 and MN7 are connected in common to a current source MN8 controlled by bias voltage $V_{BIAS}$. (for the purpose of illustration only, this current source—as well as the other current sources—supplies a current of approximately 0.3 µA). The drain terminals of transistors MN6 and MN7 are respectively connected to the drain terminals of transistors MP4 and MP7 which form a current mirror. Transistors MP9 and MN26 are cascode transistors used to increase the node impedance and amplifier gain. Series connected transistors MP22 and MP11 are used to provide an adequate bias voltage for the gate terminal of cascode transistor MP9. Transistors MP7, MP9 and MN26 are connected in series with another current source MN4 controlled by bias voltage $V_{BIAS}$. Similarly, transistors MP22 and MP11 are also connected in series with a current source MN16 controlled by bias voltage $V_{BIAS}$.

As briefly mentioned hereinabove, output stage 40 advantageously includes a source-follower transistor 45 (transistor MN42), the gate and drain terminals of which are respectively connected to the operational amplifier output 33 (the connection node between cascode transistors MP9 and MN26) and to the positive supply potential $V_{DD}$.

First switching device 51 is a single p-MOS transistor MP18 connected across terminals 33, 41 and 31 and second switching device 52 is a single n-MOS transistor MN25 connected between the source terminal of source-follower transistor 45 and another current source MN24 controlled by bias voltage $V_{BIAS}$. The connection node between transistors MN25 and MN24 forms the integrating circuit output OUT. In addition, as clearly illustrated, switching transistors MP18 and MN25 are both controlled by the RUN control signal, which is at a low state during reset and at a high state during integration.

Integrating voltage storage device 25 is formed of capacitor-connected transistor MP30, the gate terminal of transistor MP30 being coupled to the operational amplifier inverting input 31 and the drain, source and bulk terminals of this transistor MP30 being coupled to the integrating circuit output OUT. In this example, additional transistor MP31 is simply a spare for adjustment if necessary. It should be noted that MOS transistor MP30 is in "upside-down" accumulation mode, not normal inversion mode.

A compensation capacitor 60 (MOS transistor MN31) is further connected between the operational amplifier output 33 and ground $V_{SS}$ in order to provide high frequency compensation for operational amplifier 30.

FIG. 2 also shows two bypass capacitors 71, 72 respectively formed of MOS transistors MP32 and MN29. Bypass capacitor 71 (transistor MP32) is connected across the supply lines $V_{DD}$ and $V_{SS}$ whereas bypass capacitor 72 (transistor MN29) is connected across the positive input (non-inverting input 32) and ground $V_{SS}$. These bypass capacitors 71, 72 are not really a functional part of the circuit and may be removed.

As an advantageous complement to the circuit which has just been described, two additional source-follower output stages may be added to provide minimum and maximum electrical output signals allowing determination of the optical sensor within an array of multiple optical sensors with the least, respectively the greatest, intensity. This can be achieved by providing, for each optical sensor within the array, first and second source-follower output stages 91, 92 as illustrated and by connecting their outputs together to a single external current source (one for each max/min source-follower output stage). More particularly, first source-follower output stage 91 comprises a p-MOS transistor MP29, the source terminal of which forms the MinOut output which is connected to an external current source (not illustrated) common to all sensors of the array. The gate terminal of transistor MP29 is connected to the integrating circuit output OUT, while the drain terminal is connected to ground $V_{SS}$. Similarly, second source-follower output stage 92 comprises an n-MOS transistor MN21, the source terminal of which forms the MaxOut output which is connected to another external current source (not illustrated) common to all sensors of the array. The gate terminal of transistor MN21 is connected to the operational amplifier output 33, while the drain terminal is connected to the positive supply potential $V_{DD}$.

Figure 3:
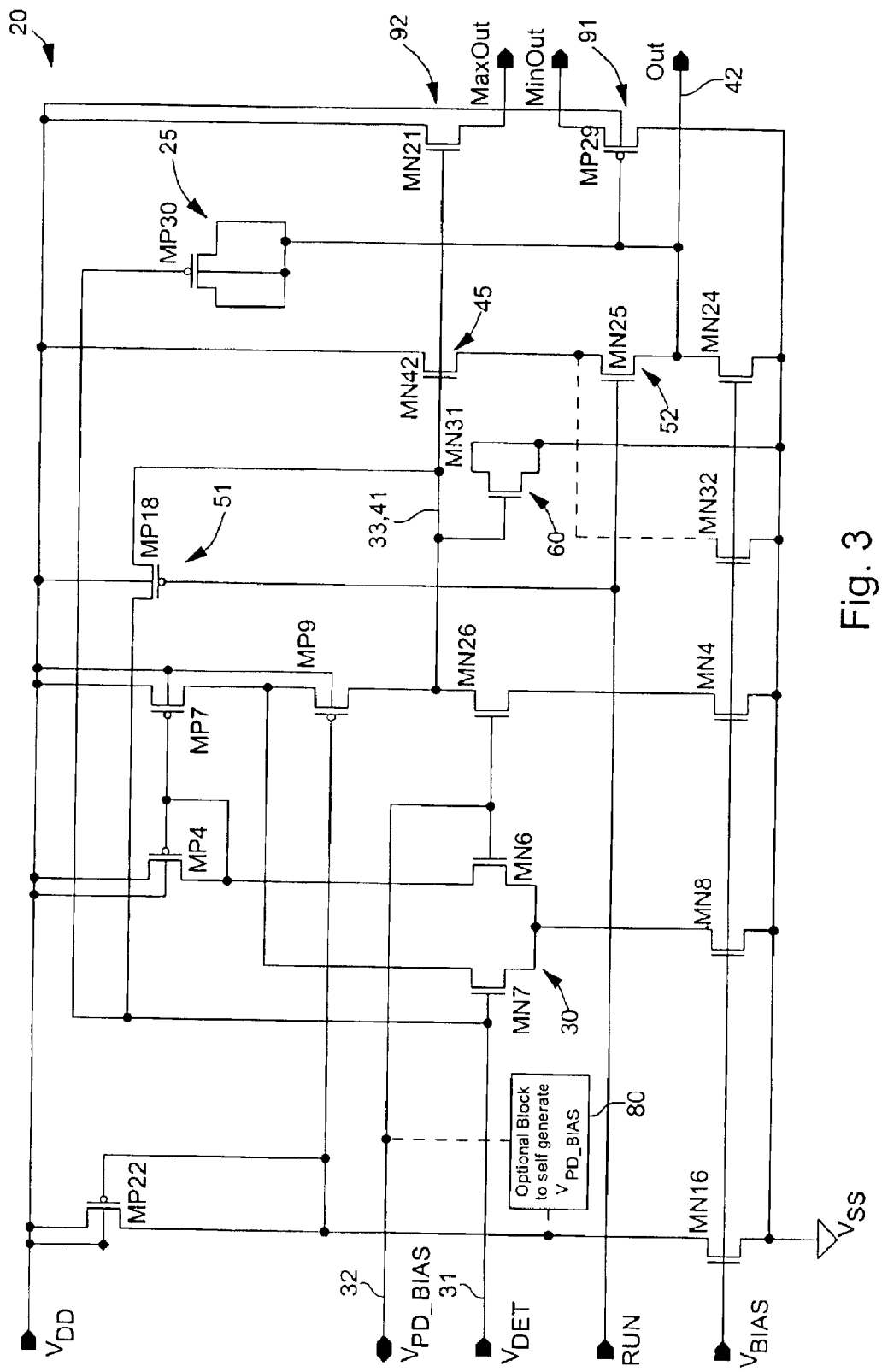
FIG. 3 is a circuit diagram illustrating a second example of an integrating circuit according to the present invention.

FIG. 3 is another possible example of the integrating circuit 20 of FIG. 1. It shows a somewhat simplified version of the circuit diagram of FIG. 2. In particular, this example does not include bypass capacitors 71, 72 and spare transistor MP31, and bias transistors MP22 and MP11 are conceptually reduced to a single transistor MP22 (the two-transistor arrangement is used in FIG. 2 because of layout considerations). The rest of the circuit is substantially similar to that of FIG. 2 and will accordingly not be described again.

Some other modifications may be made to the circuit of FIG. 3. For instance, an optional block 80 for self generating the photodetector bias voltage $V_{PD\text{-}BIAS}$ may be formed within the area of each optical sensor to reduce the number of external lines, eliminating $V_{PD\text{-}BIAS}$ and $V_{BIAS}$ lines, since neither of these is critical. By making them wires instead of in-pixel circuitry has however the advantage of allowing to save more area.

In addition, an optional extra current source (transistor MN32) connected directly to the source terminal of source-follower transistor 45 improves the action of this source-follower (transistor MN42) during the transition from reset to run, but requires some area.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to optical sensors using n-well photodiodes. As already mentioned, p-well photodiodes may equally be used (this requiring a complementary circuit architecture). By way of extension, photodetectors which are functionally equivalent to photodiodes may also be used.

What is claimed is:

1. An optical sensor for producing an electrical signal in response to electromagnetic radiation, comprising:

a photodetector having an output supplying an electrical signal proportional to the intensity of the electromagnetic radiation striking the photodetector; and an integrating circuit coupled with the output of the photodetector to accumulate the electrical signal from the photodetector, said integrating circuit comprising:

an operational amplifier having a non-inverting input connected to a non-zero bias voltage, an inverting input coupled to said photodetector, and at least one output;

an integrating voltage storage device, having a first terminal coupled to the operational amplifier output, and a second terminal coupled to the operational amplifier inverting input;

an output stage comprising a gate terminal, connected to the operational amplifier output, and an output terminal connected to said first terminal of the integrating voltage storage device, and switching circuitry for controlling timing of the integrating circuit and switching the integrating circuit between a reset phase and an integration phase, wherein said switching circuitry includes first switching device for connecting said operational amplifier output to said operational amplifier inverting input during said reset phase, and means for resetting said integrating voltage storage device during said reset phase, a voltage equal to said bias voltage being applied across said integrating voltage storage device, and said first terminal of said integrating voltage storage device being pulled to a reference potential.

2. The optical sensor according to claim 1, wherein said first switching device also disconnects said operational amplifier output from said operational amplifier inverting input during said integration phase; and wherein said switching circuitry further includes a second switching device for pulling said output stage output terminal to said reference potential during said reset phase and for releasing said output stage output terminal from said reference potential during said integration phase.

3. The optical sensor according to claim 2, wherein said output stage is a source-follower output stage.

4. The optical sensor according to claim 2, wherein said integrating circuit further comprises a frequency compensation capacitor connected between said output stage gate terminal and said reference potential.

5. The optical sensor according to claim 4, wherein said frequency compensation capacitor is a MOS transistor with common source and drain terminals.

6. The optical sensor according to claim 2, wherein said first and second switching devices are CMOS transistors.

7. The optical sensor according to claim 2, wherein said first and second switching devices are both controlled by a single control signal.

8. The optical sensor according to claim 2, wherein said operational amplifier is a differential amplifier comprising a differential pair of transistors and having a half-folded cascode stage, said integrating circuit further comprising a first current source coupled to said differential pair of transistors, a second current source coupled to said half-folded cascode stage and a third current source coupled to said output stage.

9. The optical sensor according to claim 8, wherein said second switching device is connected between said output stage output terminal and said third current source, said integrating circuit further comprising a fourth current source connected directly to said output stage output terminal.

10. The optical sensor according to claim 1, wherein said integrating voltage storage device is a MOS transistor operating in accumulation mode.

11. The optical sensor according to claim 1, wherein said photodetector is a reverse-biased photodiode.

12. The optical sensor according to claim 1, wherein said operational amplifier is a differential amplifier comprising a differential pair of transistors and having a half-folded cascode stage.

13. The optical sensor according to claim 1, for use in an optical sensor array, further comprising a first source-follower output stage for providing a minimum electrical output signal allowing determination of the optical sensor within the array with the least intensity, and a second source-follower output stage for providing maximum electrical output signal allowing determination of the optical sensor within the array of the greatest intensity.

14. The optical sensor according to claim 13, wherein said first source-follower output stage has a gate terminal connected to said first terminal of the integrating voltage storage device and a drain terminal connected to a first supply potential, a source terminal of said first source-follower output stage being coupled to a first external current source common to each optical sensor within the array, and wherein said second source-follower output stage has a gate terminal connected to said operational amplifier output and a drain terminal connected to a second supply potential, a source terminal of said second source-follower output stage being coupled to a second external current source common to each optical sensor within the array.

15. The optical sensor according to claim 1, wherein said non-zero bias voltage is supplied by voltage generating circuitry formed within said integrating circuit.

16. An integrating circuit for use with a photodetector having an output supplying an electrical signal proportional to the intensity of the electromagnetic radiation striking the photodetector, said integrating circuit comprising:

an operational amplifier having a non-inverting input connected to a non-zero bias voltage, an inverting input capable of being coupled to said photodetector, and at least one output;

an integrating voltage storage device having a first terminal coupled to the operational amplifier output and a second terminal coupled to the operational amplifier inverting input;

an output stage comprising a gate terminal connected to the operational amplifier output and an output terminal connected to said first terminal of the integrating voltage storage device; and switching circuitry for controlling timing of the integrating circuit and switching the integrating circuit between a reset phase and an integration phase, wherein said switching circuitry includes first means for connecting said operational amplifier output to said operational amplifier inverting input during said reset phase, and means for resetting said integrating voltage storage device during said reset phase, a voltage equal to said bias voltage being applied across said integrating voltage storage device, and said first terminal of said integrating voltage storage device being pulled to a reference potential.

17. The integrating circuit according to claim 16, wherein said first means also disconnects said operational amplifier output from said operational amplifier inverting input during said integration phase; and wherein said switching circuitry further includes second means for pulling said output stage output terminal to said reference potential during said reset phase and for releasing said output stage output terminal from said reference potential during said integration phase.

18. The integrating circuit according to claim 16, wherein said output stage is a source-follower output stage.

19. The integrating circuit according to claim 16, wherein said integrating voltage storage device is a MOS transistor operating in accumulation mode.

20. The integrating circuit according to claim 16, wherein said operational amplifier is a differential amplifier comprising a differential pair of transistors and having a half-folded cascode stage.

* * * * *